(12) United States Patent
Yokoyama et al.

(10) Patent No.: US 6,324,362 B1
(45) Date of Patent: Nov. 27, 2001

(54) IMAGE FORMING APPARATUS

(75) Inventors: Tadakazu Yokoyama; Masashi Hara; Mamoru Fukuda, all of Amimachi (JP)

(73) Assignee: Riso Kagaku Corporation, Tokyo (JP)

( * ) Notice: Subject to any disclaimer, the term of this patent is extended or adjusted under 35 U.S.C. 154(b) by 0 days.

(21) Appl. No.: 09/665,160

(22) Filed: Sep. 19, 2000

(30) Foreign Application Priority Data

Sep. 21, 1999 (JP) .................................................. 11-266816

(51) Int. Cl.[7] .................................................. G03G 15/00
(52) U.S. Cl. .................... 399/107; 399/183; 399/367; 399/377
(58) Field of Search .................... 399/107, 110, 399/125, 182, 183, 367, 377, 379, 380

(56) References Cited

U.S. PATENT DOCUMENTS

| | | | | |
|---|---|---|---|---|
| 4,295,732 | * | 10/1981 | Hull et al. | 399/379 X |
| 4,812,874 | * | 3/1989 | Kubota et al. | 399/185 |
| 4,829,341 | * | 5/1989 | Sasaki et al. | 399/377 X |
| 4,990,952 | * | 2/1991 | Watanabe | 399/377 X |
| 4,996,561 | * | 2/1991 | Yoshimura et al. | 399/107 |
| 5,220,393 | * | 6/1993 | Otomo | 399/125 |
| 5,881,351 | * | 3/1999 | Shimotoso et al. | 399/377 |

FOREIGN PATENT DOCUMENTS 11-327221  *  11/1999  (JP) .

* cited by examiner

*Primary Examiner*—Sandra Brase
(74) *Attorney, Agent, or Firm*—Nixon Peabody LLP; Donald R. Studebaker (57) ABSTRACT

An image forming apparatus includes an original read-out station which is provided on an image forming apparatus body and on which an original is placed and read out in a predetermined read-out position, a digitizer for designating an area of the original, and an automatic document feeder for feeding an original to the read-out position. The automatic document feeder and the digitizer are mounted on the image forming apparatus body for rotation about respective axes between their respective operative positions where they are opposed to the original read-out station and their respective retracted positions where they are away from the original read-out station to open the original read-out station. The automatic document feeder is provided with a digitizer receiving portion on the side which is opposed to the original read-out station when the automatic document feeder is in the operative position so that the digitizer is received in the digitizer receiving portion of the automatic document feeder when the automatic document feeder and the digitizer are both in their operative positions.

6 Claims, 9 Drawing Sheets

IMAGE FORMING APPARATUS

BACKGROUND OF THE INVENTION

1. Field of the Invention

This invention relates to an image forming apparatus such as a printer, a copier or the like provided with both an original feeder such as an automatic document feeder and an area designating means such as a digitizer.

2. Description of the Related Art

In an image forming apparatus such as a printer or a copier, there is often provided an automatic document feeder in order to increase the efficiency of reading originals. The automatic document feeder is generally mounted on the image forming apparatus to be able to rotate between a retracted position where it opens an original read-out station of the image forming apparatus on which an original is placed to be read out, and an operative position where it is positioned over the original read-out station and automatically feeds originals to the original read-out station. The automatic document feeder also functions as an original holder for holding an original on the original read-out station.

Further, it has been put into practice to form an image of only a selected part of the original by designating a part to be extracted or a part to be cancelled by the use of a digitizer. In the digitizer, a plurality of points on the original placed on an input face are designated by lightly touching the original with, for instance, a stylus pen, and he designated points are electrically detected, and the elected part of the original is determined on the basis of he designated points.

Conventionally, the automatic document feeder and the digitizer are separately provided above the original read-out out station, which increases the vertical dimension of the image forming apparatus. Though the size of the image forming apparatus can be reduced by installing the digitizer in a position away from the image forming apparatus, this approach is disadvantageous in that the digitizer becomes inconvenient and the space for installing the digitizer is necessary.

SUMMARY OF THE INVENTION

In view of the foregoing observations and description, the primary object of the present invention is to provide an image forming apparatus which is provided with both an automatic document feeder and a digitizer and nevertheless can be small in size.

The image forming apparatus in accordance with the present invention comprises an original read-out station which is provided on an image forming apparatus body and on which an original is placed and read out in a predetermined read-out position, an area designating means for designating an area of the original, and an original feeder means for feeding an original to the read-out position, and is characterized in that the original feeder means and the area designating means are mounted on the image forming apparatus body for rotation about respective axes between their respective operative positions where they are opposed to the original read-out station and their respective retracted positions where they are away from the original read-out station to open the original read-out station, and the original feeder means is provided with an area designating means receiving portion on the side which is opposed to the original read-out station when the original feeder means is in the operative position so that the area designating means is received in the area designating means receiving portion of the original feeder means when the original feeder means and the area designating means are both in their operative positions.

It is preferred that the original feeder means and the area designating means be coaxially mounted for rotation.

In this case, it is preferred that a locking means for connecting the area designating means to the original feeder means so that the area designating means and the original feeder means can be rotated integrally with each other.

Further, it is preferred that the original feeder means be mounted for rotation by a balanced hinge.

In this case, it preferred that the area designating means be also mounted for rotation by a balanced hinge.

Further, it is preferred that the area designating means be connected to the original feeder means by way of a damper which supports the area designating means with respect to the original feeder means under a damping effect.

In accordance with the present invention, since the area designating means is received in the area designating means receiving portion formed on the original feeder means, the area designating means and the original feeder means can be compactly mounted on the image forming apparatus body without substantially enlarging the overall size of the image forming apparatus.

Further, when the original feeder means and the area designating means are coaxially mounted, they can be smoothly rotated.

Further by locking the area designating means to the original feeder means by the locking means, the area designating means and the original feeder means can be easily rotated integrally with each other.

Further, when the original feeder means is supported for rotation by a balanced hinge, the weight of the original feeder means is supported by the balanced hinges, and accordingly rotation of the original feeder means is facilitated.

Further, when the area designating means is supported for rotation by a balanced hinge, the weight of the area designating means is supported by the balanced hinges, and accordingly rotation of the area designating means is facilitated.

Further, when the area designating means is connected to the original feeder means by way of a damper, abrupt rotation of the area designating means and the original feeder means can be prevented.

DESCRIPTION OF THE PREFERRED EMBODIMENT

Figure 1:
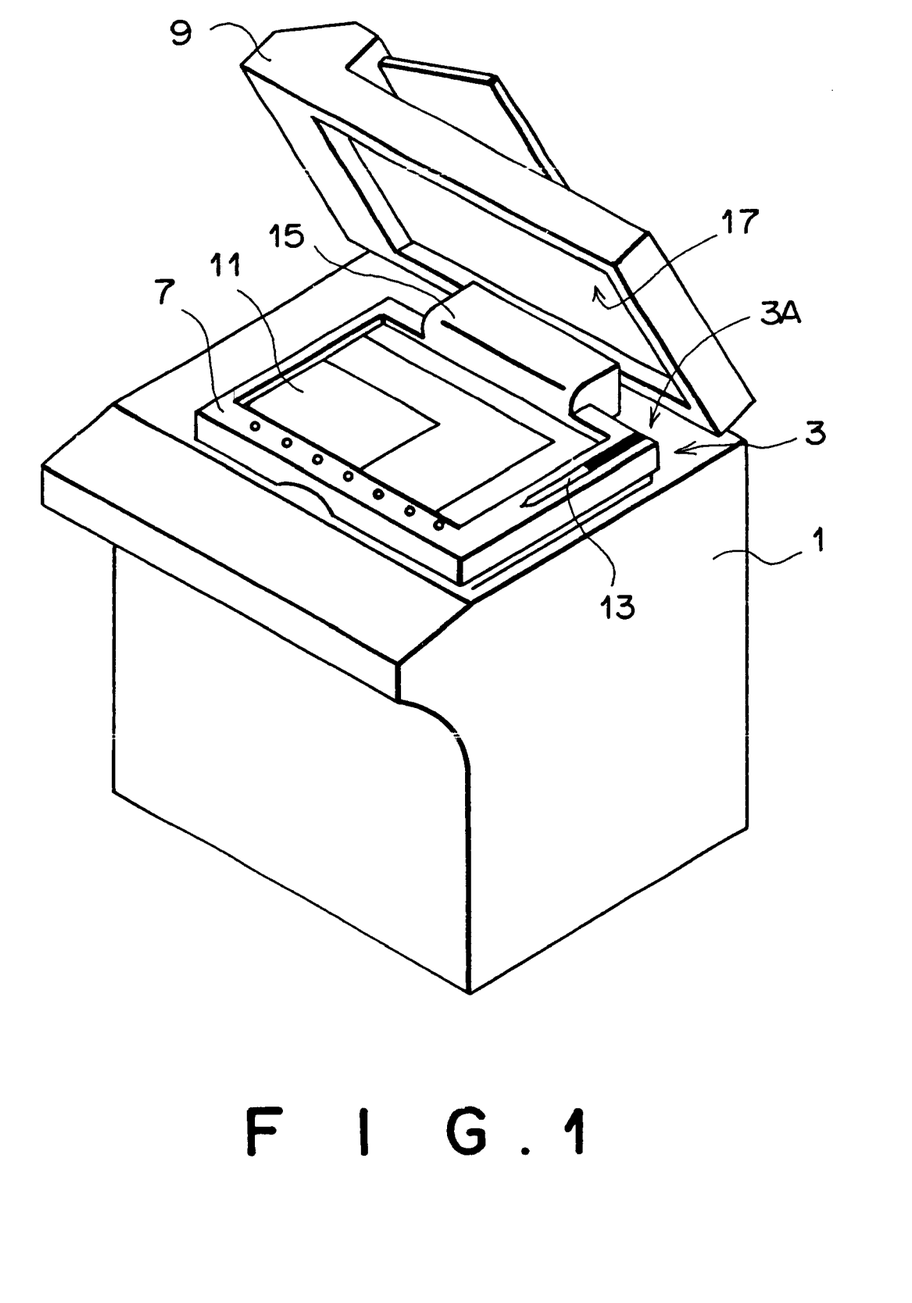
FIG. 1 is a perspective view of a stencil printer in accordance with an embodiment of the present invention.

In FIG. 1, a stencil printer in accordance with an embodiment of the present invention comprises a printer body 1, an original read-out station 3 provided on the top of the printer body 1 and having a stage glass 5, a digitizer 7 provided on the stage glass 5 as an area designating means, and a automatic document feeder 9 provided above the digitizer 7.

The digitizer 7 comprises a coordinate input face 11 on which an original is located and a stylus pen 13 f or designating coordinates. The digitizer 7 is mounted at its one end portion 15 on a peripheral portion 3A of the original read-out station 3 of the printer body 1 to be rotatable between an operative position where it rests on the stage glass 5 of the original read-out station 3 and closes the stage glass 5 and a retracted position where it is away from the stage glass 5 and opens the same.

Figure 2:
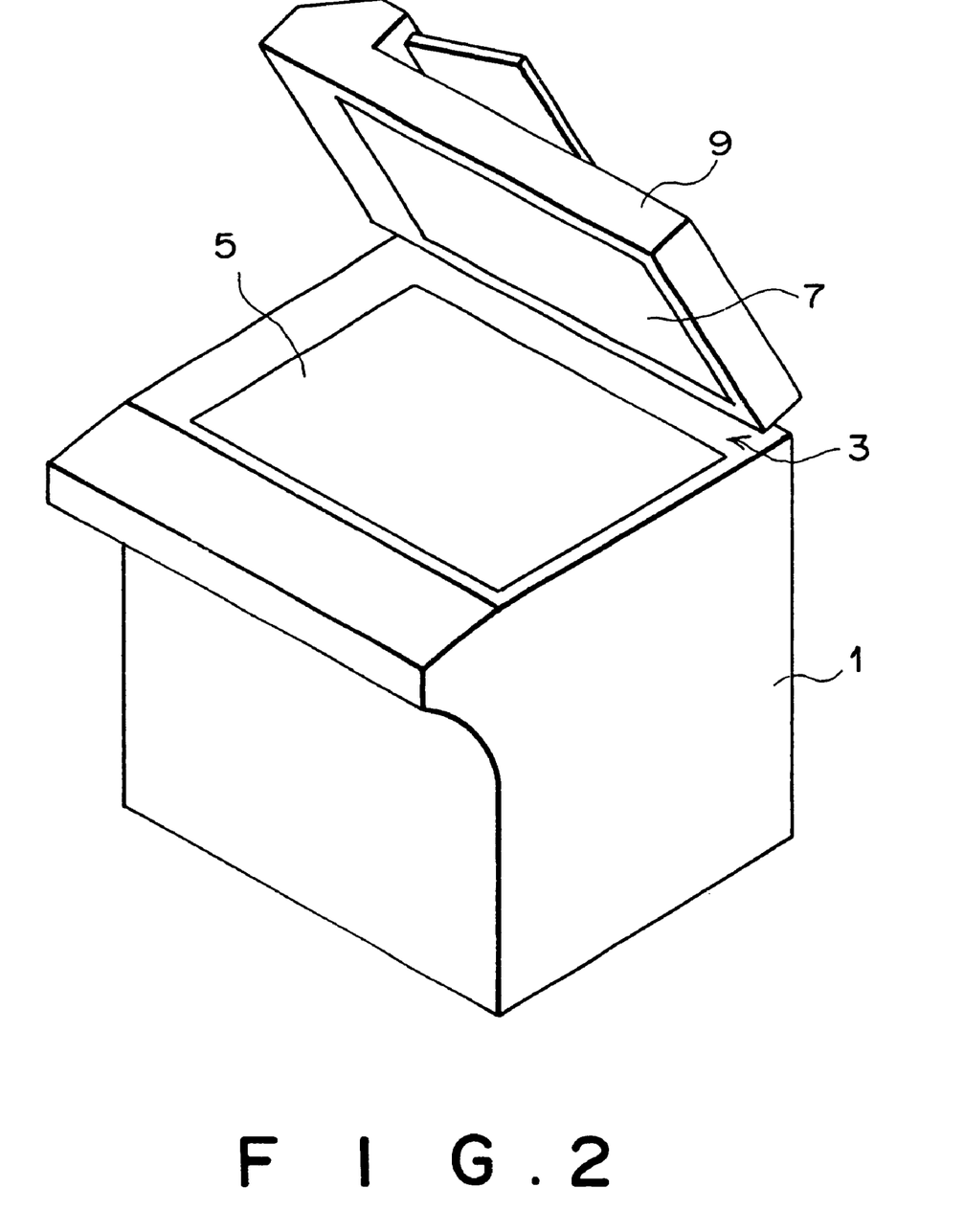
FIG. 2 is a perspective view of the stencil printer with the digitizer and the automatic document feeder opened.

The automatic document feeder 9 i s mounted at its one end portion on the peripheral portion 3A of the original read-out station 3 coaxially with the digitizer 7 so that the automatic document feeder 9 is positioned above the digitizer 7. The automatic document feeder 9 is rotatable between an operative position where it rests on the stage glass 5 of the original read-out station 3 and closes the stage glass 5 and a retracted position where it is away from the stage glass 5 and opens the same. A digitizer receiving portion 17 which is shaped to conform to the outer shape of the digitizer 7 is formed on the lower side of the automatic document feeder 9 so that the digitizer 7 can be received in the digitizer receiving portion 17 as shown in FIG. 2.

Figure 3:
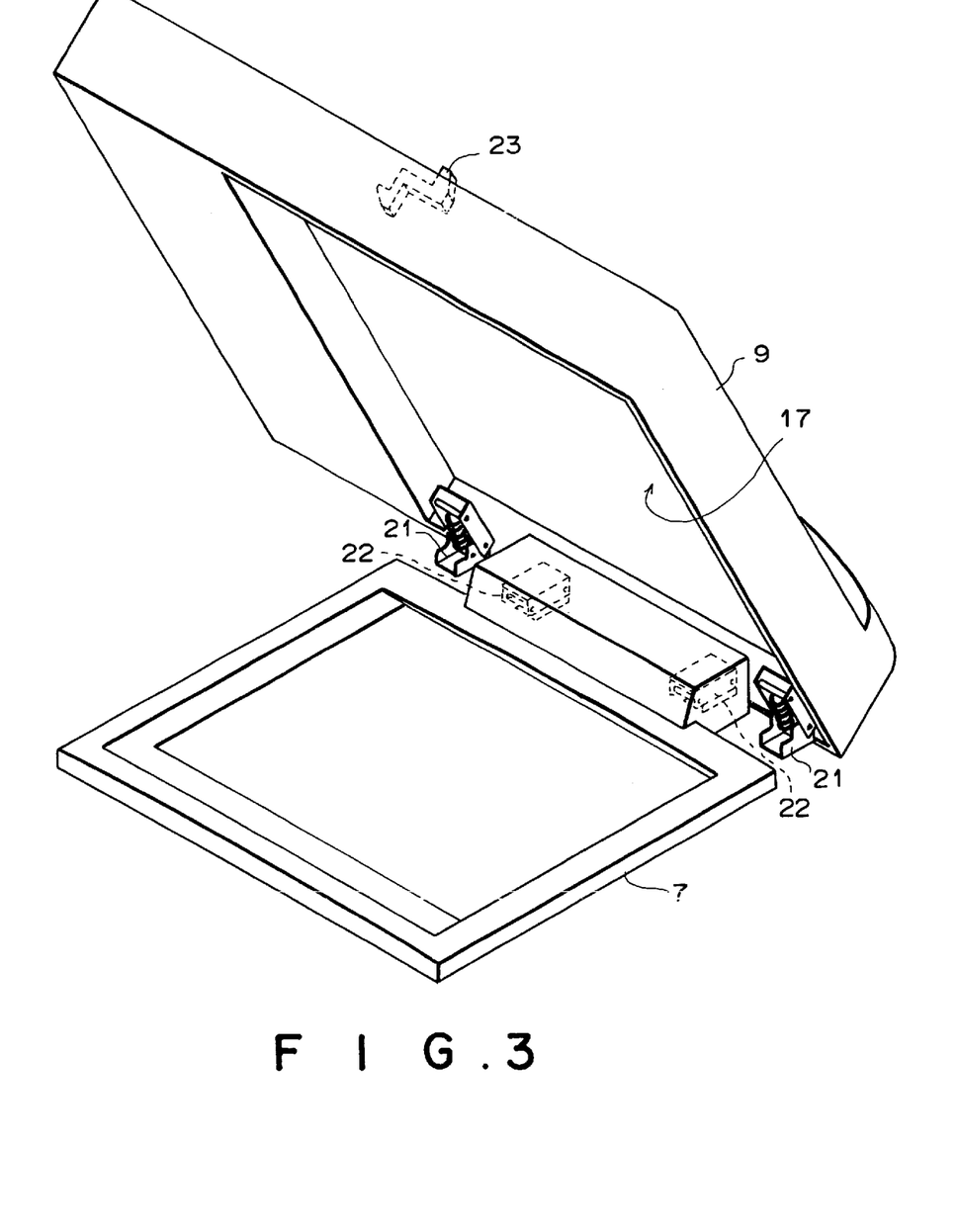
FIG. 3 is a perspective view showing mounting of the digitizer and automatic document feeder.

As shown in FIG. 3, the automatic document feeder 9 is mounted for rotation on the peripheral portion 3A of the original read-out station 3 by a pair of balanced hinges 21 disposed at a predetermined distance from each other. Also, the digitizer 7 is mounted for rotation on the peripheral portion 3A of the original read-out station 3 by a pair of balanced hinges 22 disposed at a predetermined distance from each other. A locking claw 23 for locking the digitizer 7 to the automatic document feeder 9 is provided near the end portion of the automatic document feeder 9 opposite to the end portion at which the automatic document feeder 9 is mounted on the peripheral portion 3A of the original read-out station 3. When the locking claw 23 is brought into engagement with an engagement portion (will be described later) provided on the digitizer 7, the digitizer 7 is integrally connected to the automatic document feeder 9. When the digitizer 7 is integrally connected to the automatic document feeder 9, they are rotated together and can function as an original holder for holding the original on the stage glass 5.

Figure 4:
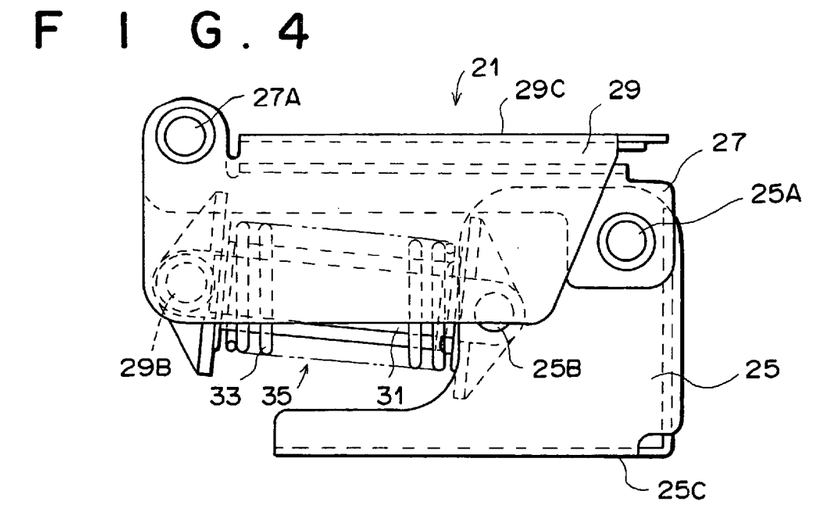
FIG. 4 is a view showing a state of the balanced hinge when the automatic document feeder is closed.

The structure of the balanced hinges 21 and 22 will be described hereinbelow. Since the balanced hinges 21 and 22 are of the same structure, only the balanced hinge 21 will be described here with reference to FIG. 4. As shown in FIG. 4, the balanced hinge 21 comprises a base portion 25 having a bottom face 25C at which the balanced hinge 21 is fixed to the peripheral portion 3A of the original read-out station 3, an intermediate portion 27 supported for rotation on a pivot 25A on the base portion 25, a mounting portion 29 supported for rotation on a pivot 27A on the intermediate portion 27, and a damper 35 mounted between a pivot 25B on the base portion 25 and a pivot 29B on the mounting portion 29. The damper 35 comprises a spring guide 31 and a spring 33. The automatic document feeder 9 is mounted on a mounting face 29C of the mounting portion 29. FIG. 4 shows a state of the balanced hinge 21 where the automatic document feeder 9 is in the operative position where it closes the stage glass 5. In this state, the spring 33 is compressed.

In this state, the springs 33 of the balanced hinges 21 urge the automatic document feeder 9 toward the retracted position where it opens the stage glass 5. The force of the springs 33 is set according to the weight of the automatic document feeder 9 so that the automatic document feeder 9 can be smoothly rotated and stopped in any desired position. Similarly, the force of the corresponding springs of the balanced hinges 22 is set according to the weight of the digitizer 7 so that the digitizer 7 can be smoothly rotated and stopped in any desired position. The pivots 25A and 27A of the balanced hinges 21 and 22 are coaxial with each other.

Figure 5:
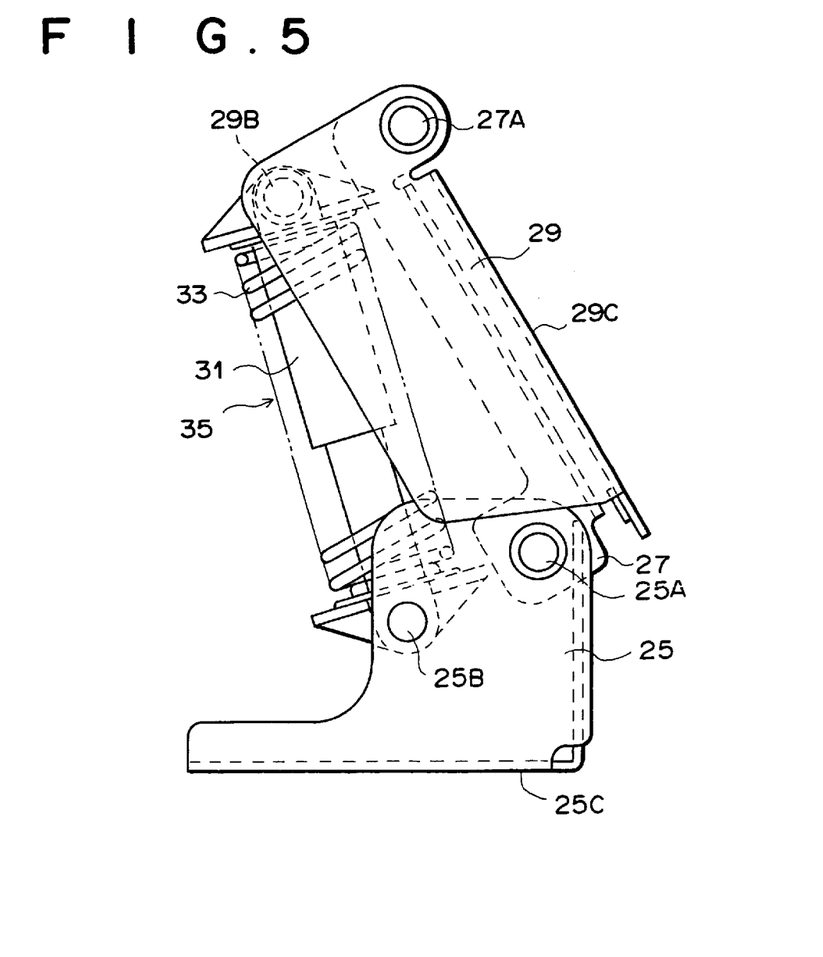
FIG. 5 is a view showing a state of the balanced hinge when the automatic document feeder is opened.

When the automatic document feeder 9 is rotated toward the retracted position, the spring 33 stretches and the mounting portion 29 and the intermediate portion 27 are integrally rotated about the pivot 25A as shown in FIG. 5.

Figure 6:
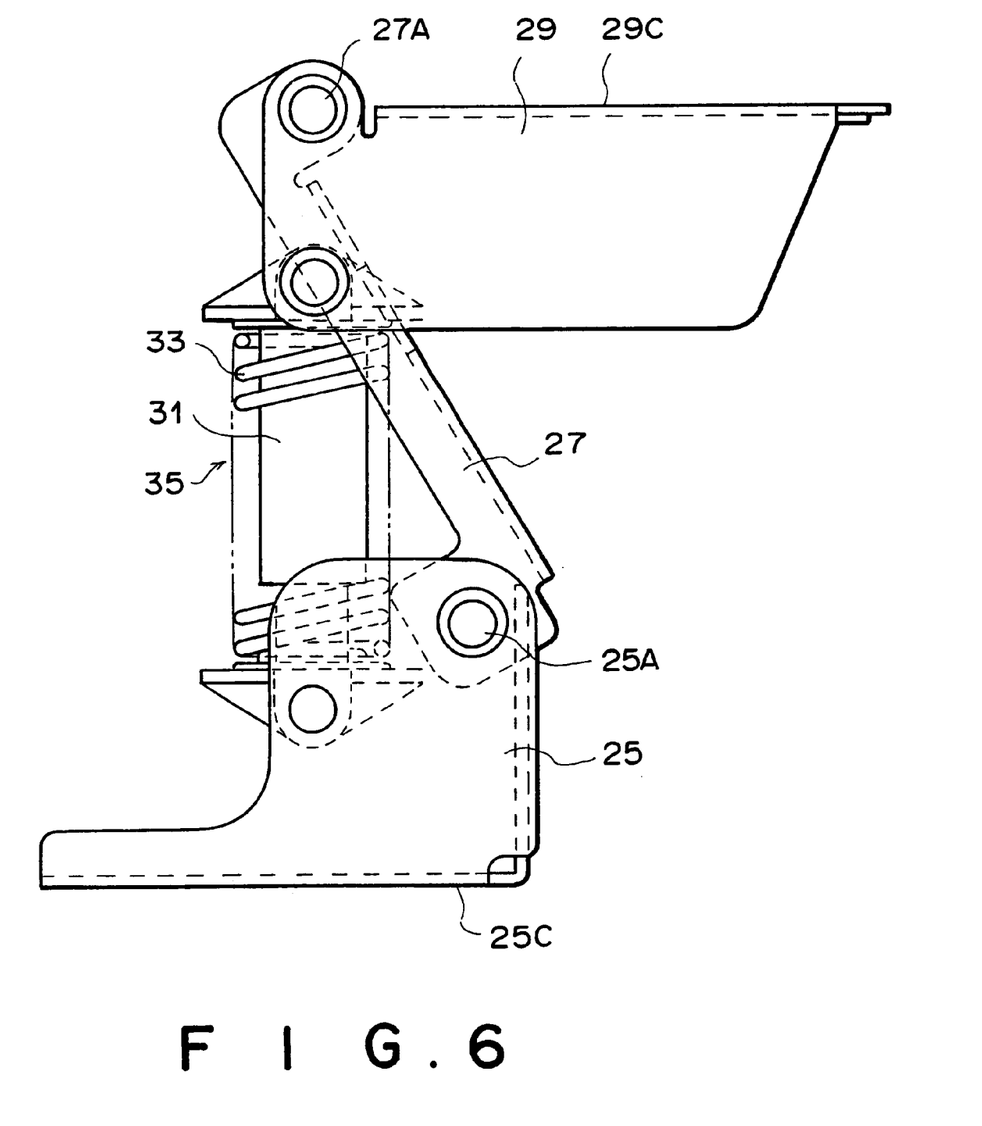
FIG. 6 is a view showing a state of the balanced hinge when the automatic document feeder is lifted by a book.
Figure 7:
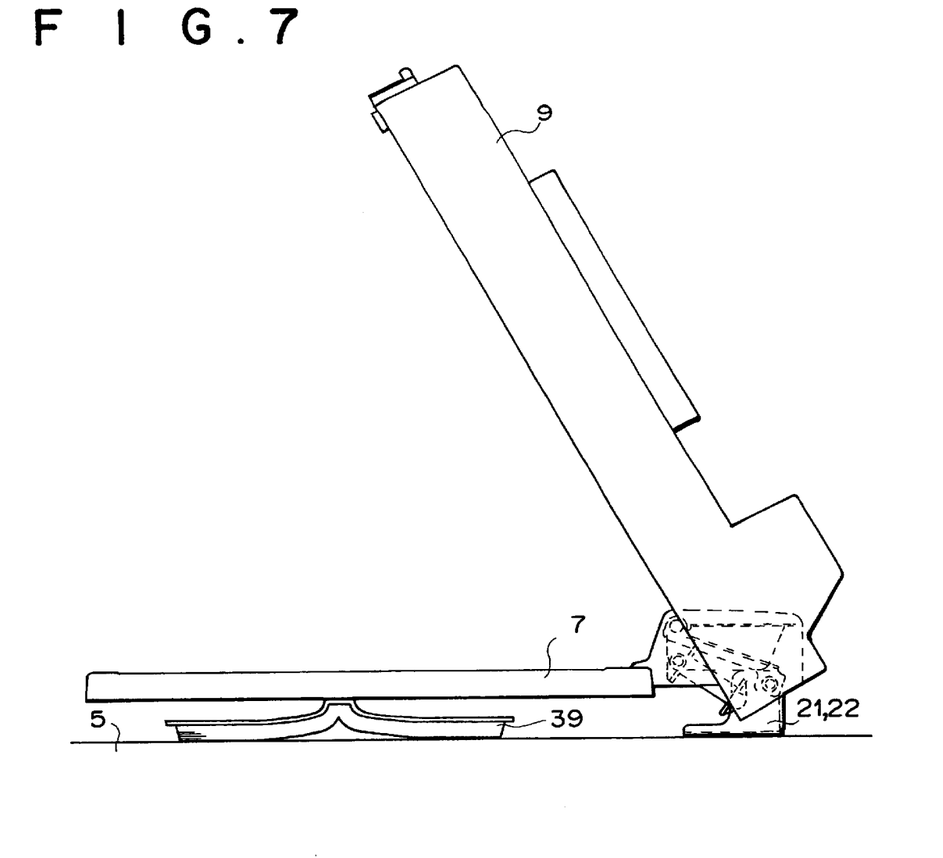
FIG. 7 is a view showing a state of the digitizer and the automatic document feeder when the digitized is to be used with a book rested on the stage glass.
Figure 8:
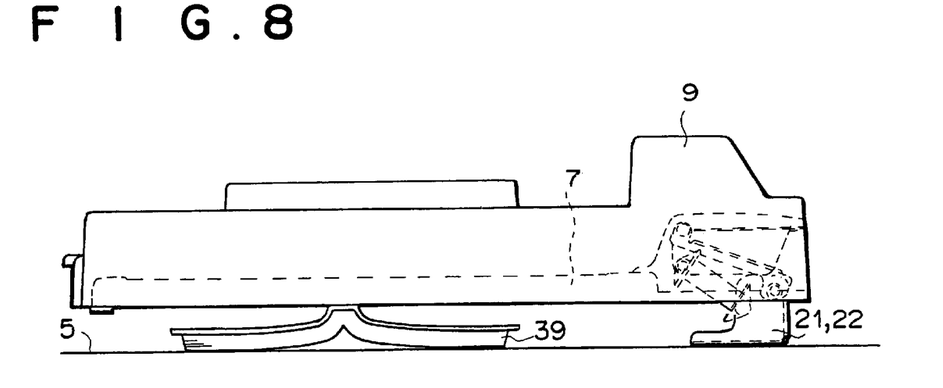
FIG. 8 is a view showing a state of the digitizer and the automatic document feeder when they are used as an original holder with a book rested on the stage glass.

The mounting portion 29 can be rotated relative to the intermediate portion 27 about the pivot 27A so that the mounting face 29C of the mounting portion 29 is parallel to the bottom face 25C of the base portion 25 as shown in FIG. 6. Such an arrangement of the balanced hinges 21 and 22 permits the automatic document feeder 9 and the digitizer 7 to be in parallel to the stage glass 5 as shown in FIGS. 7 and 8. That is, in the case of a thick original such as a book (book lift) and the digitizer 7 is to be used, the digitizer 7 is rested on the book 39 in parallel to the stage glass 5 with the automatic document feeder 9 left in the retracted position as shown in FIG. 7. When the digitizer 7 is locked to the automatic document feeder 9 and the digitizer 7 and the automatic document feeder 9 are used as an original holder, they are rested on the book 39 in parallel to the stage glass 5 as shown in FIG. 8.

Figure 9:
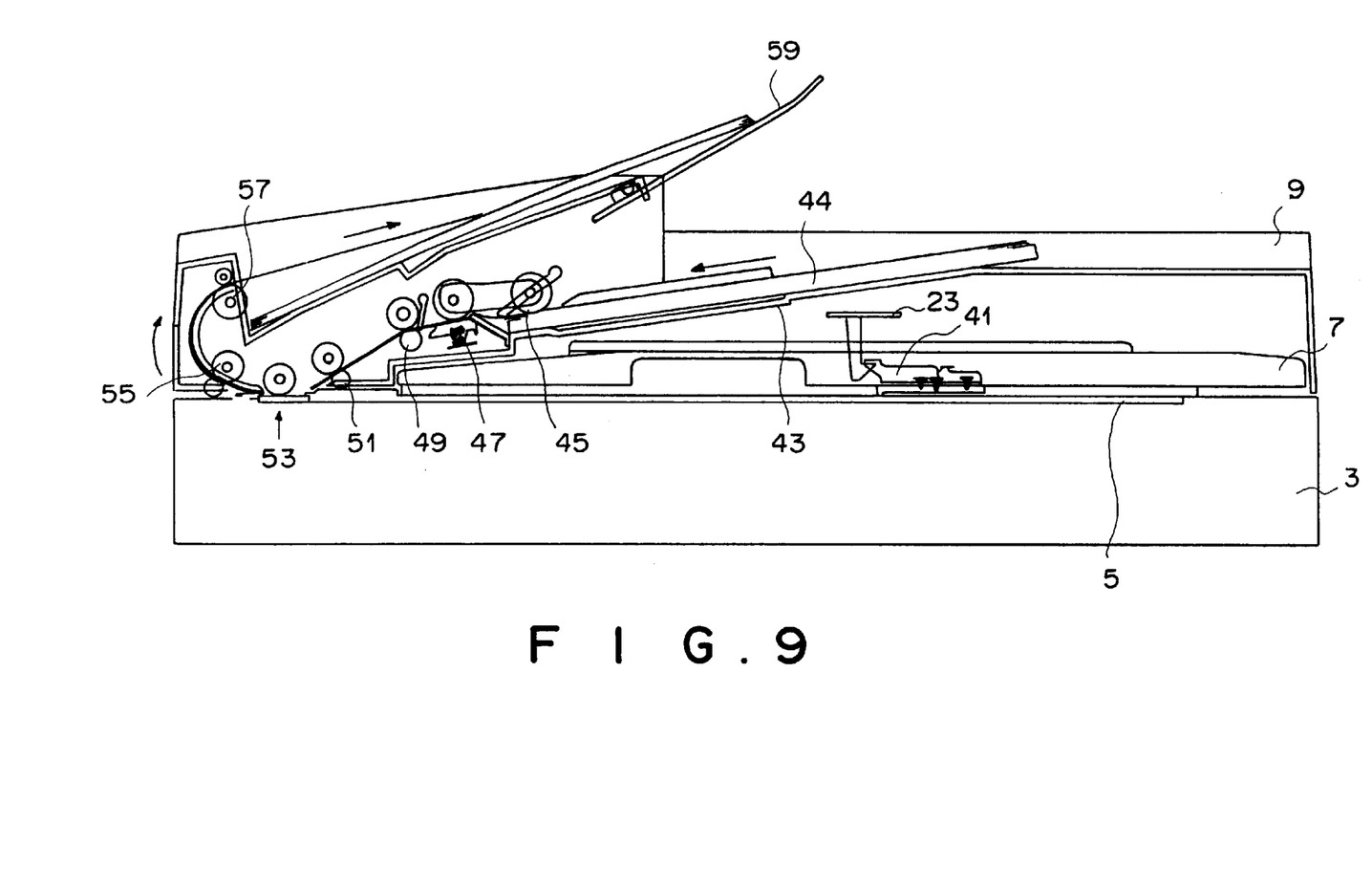
FIG. 9 is a view showing the automatic document feeder in the operative position.

FIG. 9 shows a state of the stencil printer when the automatic document feeder 9 is to be used. As shown in FIG. 9, when the automatic document feeder 9 is used, the locking claw 23 of the automatic document feeder 9 is brought into engagement with an engagement portion 41 on the digitizer 7, whereby the digitizer 7 is locked to the automatic document feeder 9, and then the automatic document feeder 9 is rotated to the operative position together with the digitizer 7. originals 44 stacked on an original table 43 are separated from each other by a pickup roller 45 and a separator roller 47 and are conveyed to a read-out position 53 one by one by conveyor roller 49 and 51. After read out in the read-out position, each original 44 is discharged to a discharge tray by discharge rollers 55 and 57. The original discharge path is set not to interfere with the digitizer 7.

As can be understood from the description above, in the stencil printer of this embodiment, since the digitizer 7 and the automatic document feeder 9 are mounted for rotation on the peripheral portion 3A of the original read-out station 3 so that the digitizer 7 is positioned below the automatic document feeder 9 and can be received in the digitizer receiving portion 17 formed on the lower side of the automatic document feeder 9, the digitizer 7 and the automatic document feeder 9 can be compactly mounted on the printer body 1 without substantially enlarging the overall size of the printer.

Further by locking the digitizer 7 to the automatic document feeder 9 by means of the locking claw 23 and the engagement portion 41, the digitizer 7 and the automatic document feeder 9 can be easily rotated integrally with each other.

Further, since the digitizer 7 and the automatic document feeder 9 are rotated about a common axis, they can be smoothly rotated.

Further, since the digitizer 7 and the automatic document feeder 9 are supported for rotation on the balanced hinges 21 and 22, the weights of the digitizer 7 and the automatic document feeder 9 are supported by the balanced hinges 21 and 22, which facilitates rotation of the digitizer 7 and the automatic document feeder 9.

Figure 10:
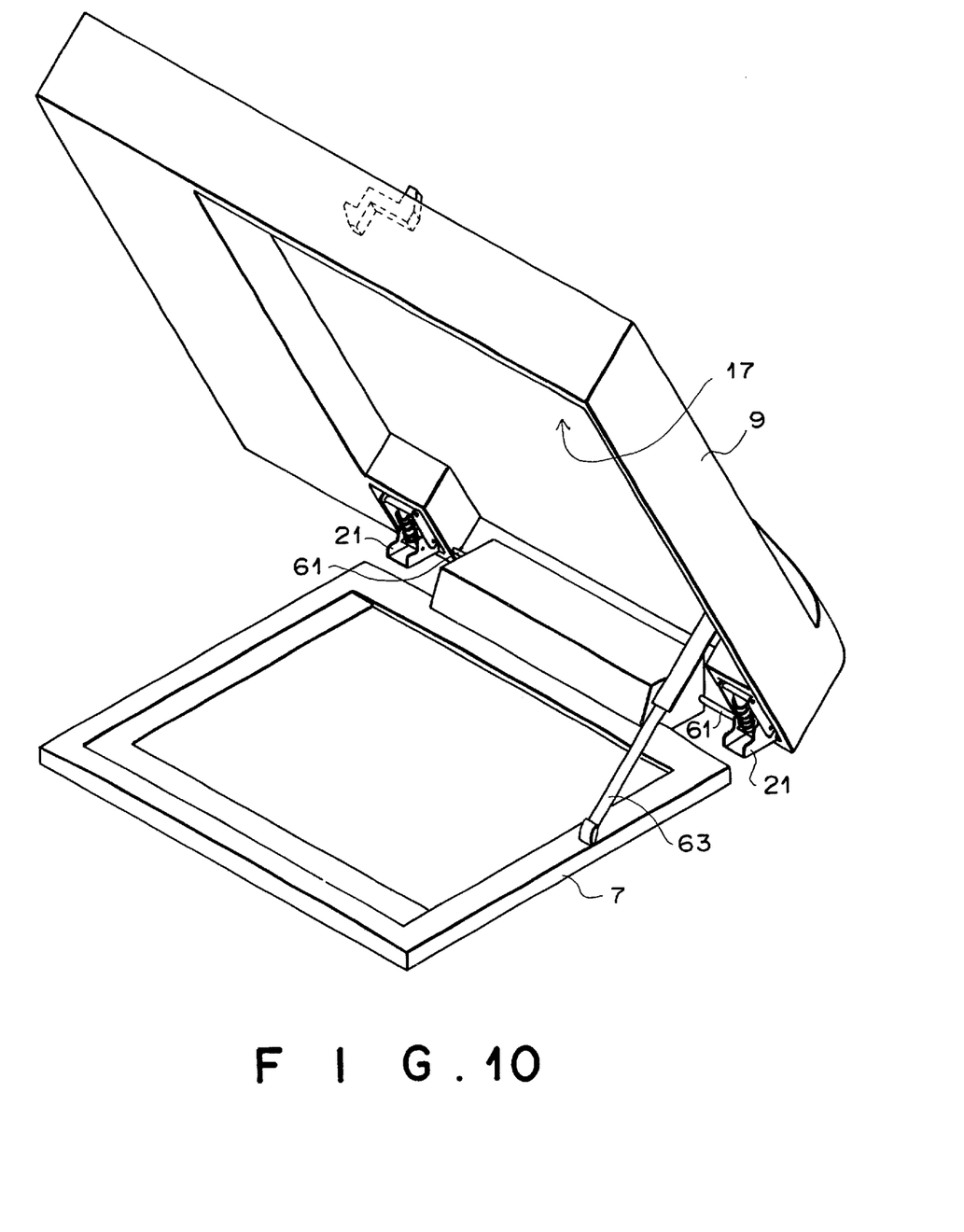
FIG. 10 is a perspective view showing a modification of the stencil printer.

Though, in the embodiment described above, also the digitizer 7 is supported by balanced hinges, the digitizer 7 may be supported by a simple shaft 61 coaxially with the automatic document feeder 9 as shown in FIG. 10 without using balanced hinges since the digitizer 7 is light as compared with the automatic document feeder 9. In this case, the force of the springs 33 of the balanced hinges 21 for the automatic document feeder 9 is set taking into account both the weight of the automatic document feeder 9 and the weight of the digitizer 7. However, in this case, when only the automatic document feeder 9 is rotated with the digitizer 7 released from the automatic document feeder 9, there is a fear that the automatic document feeder 9 can be rotated at an excessively high speed since the load on the springs 33 of the balanced hinges is reduced by the weight of the digitizer 7.

Figure 11:
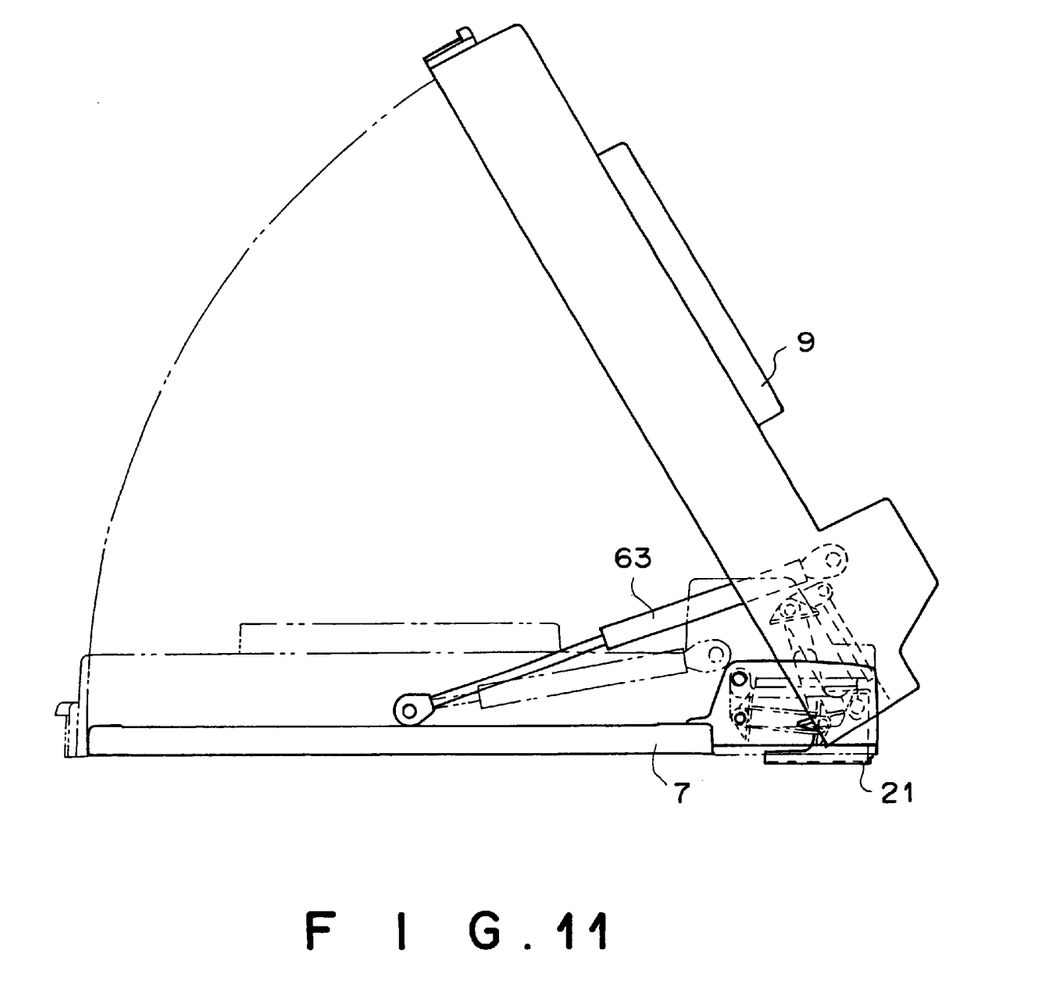
FIG. 11 is a side view showing opening and closure of the automatic document feeder in the modification shown in FIG. 10.

This problem can be overcome by providing a damper 63 between the digitizer 7 and the automatic document feeder 9 as shown in FIG. 11. With this arrangement, since the automatic document feeder 9 is opened supporting the weight of the digitizer 7, the automatic document feeder 9 cannot be rotated at an excessively high speed.

Though, in the embodiment described, the present invention is applied to a stencil printer, the present invention may be applied to any other image forming apparatus such as a copier.

In addition, all of the contents of Japanese Patent Application No. 11(1999)-266816 are incorporated into this specification by reference.

What is claimed is:

1. An image forming apparatus comprising an original read-out station which is provided on an image forming apparatus body and on which an original is placed and read out in a predetermined read-out position, an area designating means for designating an area of the original, and an original feeder means for feeding an original to the read-out position, wherein the improvement comprises that the original feeder means and the area designating means are mounted on the image forming apparatus body for rotation about respective axes between their respective operative positions where they are opposed to the original read-out station and their respective retracted positions where they are away from the original read-out station to open the original read-out station, and the original feeder means is provided with an area designating means receiving portion on the side which is opposed to the original read-out station when the original feeder means is in the operative position so that the area designating means is received in the area designating means receiving portion of the original feeder means when the original feeder means and the area designating means are both in their operative positions.

2. An image forming apparatus as defined in claim 1 in which the original feeder means and the area designating means are coaxially mounted for rotation.

3. An image forming apparatus as defined in claim 2 further comprising a locking means for connecting the area designating means to the original feeder means so that the area designating means and the original feeder means can be rotated integrally with each other.

4. An image forming apparatus as defined in claim 1 in which the original feeder means is mounted for rotation by a balanced hinge.

5. An image forming apparatus as defined in claim 4 in which the area designating means is also mounted for rotation by a balanced hinge.

6. An image forming apparatus as defined in claim 1 in which the area designating means is connected to the original feeder means by way of a damper which supports the area designating means with respect to the original feeder means under a damping effect.

* * * * *